(No Model.) 2 Sheets—Sheet 2.
M. D. MARTINDALE.
WRENCH.
No. 568,692. Patented Sept. 29, 1896.
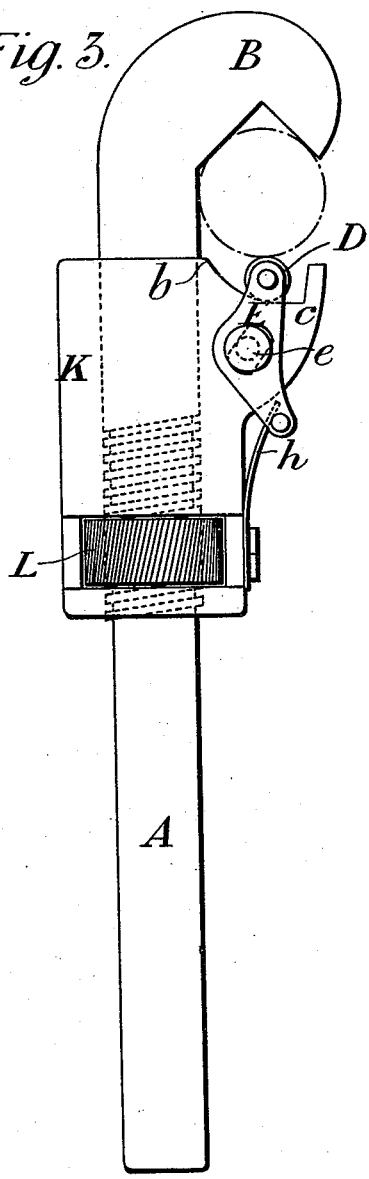
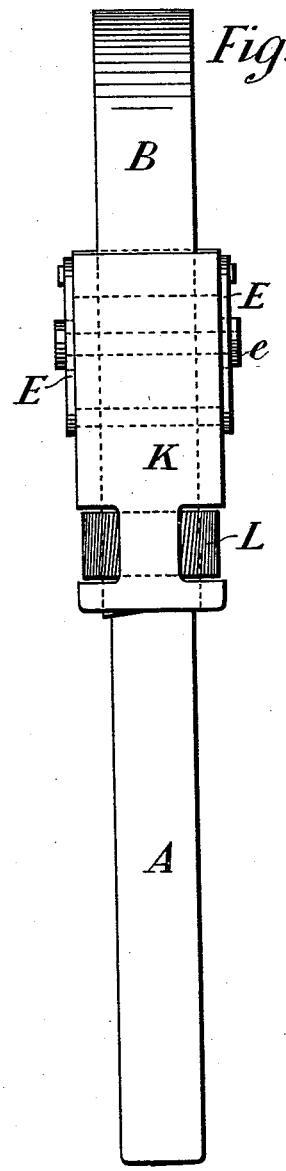
Witnesses:
Thos. A. Gunn
Robt. Emmett
Inventor
Montagu D. Martindale
By James L. Norris.
Atty.
THE NORRIS PETERS CO., PHOTO-LITHO., WASHINGTON, D. C.

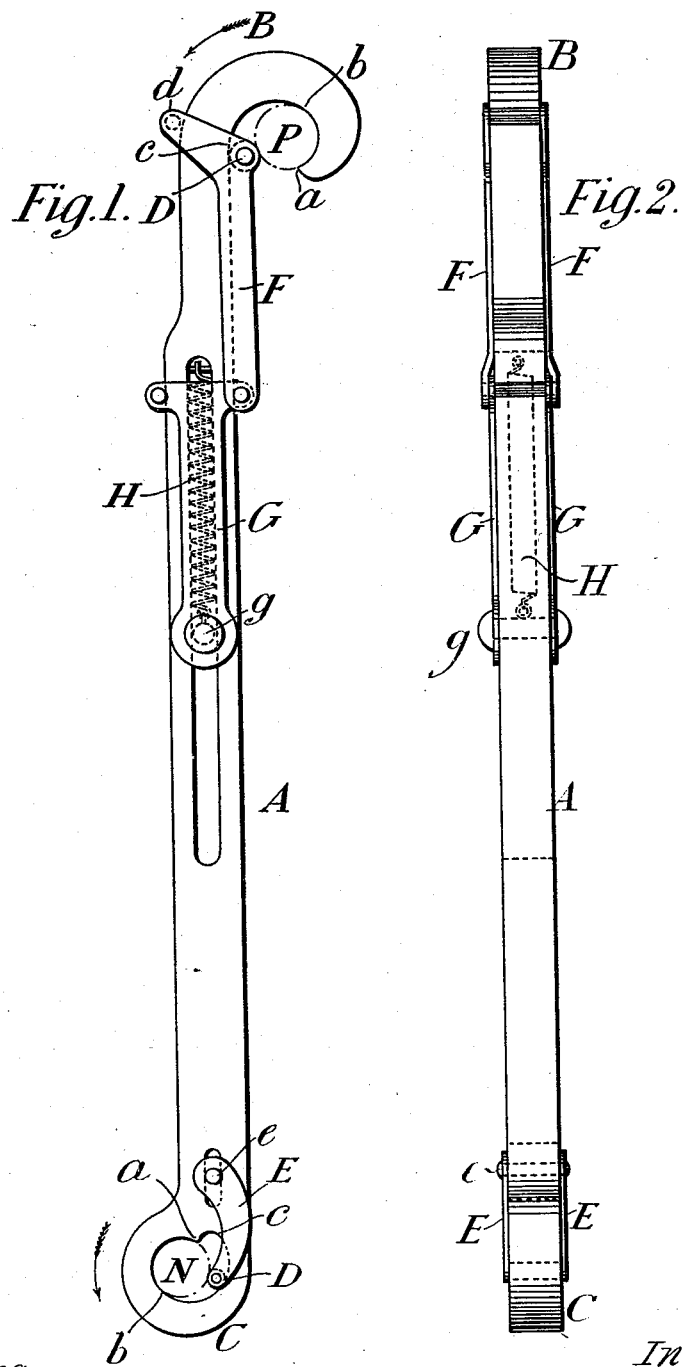

UNITED STATES PATENT OFFICE.

MONTAGU D. MARTINDALE, OF LONDON, ENGLAND.

WRENCH.

SPECIFICATION forming part of Letters Patent No. 568,692, dated September 29, 1896.

Application filed July 15, 1896. Serial No. 599,283. (No model.)

*To all whom it may concern:*

Be it known that I, MONTAGU DEURANCÉ MARTINDALE, a citizen of England, residing at No. 8 St. Mary's Terrace, Paddington, London, in the county of Middlesex, England, have invented a certain new and useful Wrench for Turning Pipes or other Round Objects, of which the following is a specification.

My invention relates to the construction of a wrench which when moved by its stem or handle in the one direction bites and firmly holds a pipe or other round object, such, for instance, as a round nut or the round stem of a drill, causing the pipe or round object to turn with it, but which when moved in the opposite direction releases itself and can be moved without turning the pipe or round object. I shall describe the appliance and arrangement of a wrench for operating in this manner, referring to the accompanying drawings.

Figure 1 is a side view, and Fig. 2 a rear view, of a wrench, one end of which can be used to turn a pipe or round bar to which it can be applied sidewise, the other end being applicable to a nut or other round object endwise. Fig. 3 is a side view, and Fig. 4 a back view, showing a modification by which the wrench can be adapted for turning pipes or round objects of different diameters.

In all these cases the principle according to which the wrench is made to bite and release is the same, but the forms of the parts are modified to suit the several applications.

As shown in Figs. 1 and 2, a bar A is made at the one end with a hook B; at the other end with an eye C. About half the inner circumference of the opening of the hook, or the opening forming the eye, is made circular from the point $a$ to the point $b$ to the same diameter as the pipe P, nut R, or other circular object to which it is to be applied. The remainder of the circumference of the opening of the hook, or of the opening forming the eye, is made of a spiral curvature having radius increasing gradually from $b$ to $c$. A small roller D, made of hard metal, such as hardened steel, and roughened like a round file, is pivoted between two arms E E or F F, one on each side of the bar A, so that it lies in the space between the pipe or nut and the spiral part of the hook or eye.

The two arms E E are connected by a pin $e$, working in a slotted hole of the bar A, so that the roller D can freely move longitudinally and transversely, and the arms F F are pivoted to a pair of cheeks G G, which are connected by a pin $g$, working in a slotted hole of the bar A. The arms F F have oblique extensions holding a pin $d$, which, bearing against the back of the hook, prevents the arms F F and roller D from falling away from the bar A. A tension-spring H may have its one end fixed to the end of the slot, its other end being attached to the pin $g$, so as to urge the roller D into the narrowing space within the spiral. This spring, however, is not necessary, as the cheeks G can be pushed onward by hand.

For applying the wrench the arms E E or F F are drawn back so as to bring the roller D to a wide part of the space within the spiral. The hook B or the eye C is then applied to the round object, so that it occupies the position P or N, the roller D being then advanced by hand or by the spring H. On moving the bar A so as to turn the hook or the eye in the direction of the arrow the roller D tends to occupy a narrower part of the space within the spiral, and is thus made to take a firmer bite of the round object and to turn with the hook or the eye. On reversing the movement the roller D tends to move into a wider part of the space within the spiral and so becomes free from P or N and to move without turning the round object.

As shown in Figs. 3 and 4, the hook B forms internally part of a polygon, and the spiral curvature $b\ c$ is formed in the upper part of a slide K, which can be moved to and fro along the handle A by a nut engaging screw-threads on the handle in the well-known manner applied to universal wrenches. The roller D is pivoted to the arms E E, which are connected by a pin $e$, working in a slotted hole of K. A blade-spring $h$ may be used to urge the roller D toward the handle, but this is not necessary. The action of this wrench is the same as of the wrenches above described, the construction differing from them only in that it can be adjusted for a number of different diameters of the pipes or other round objects to which it is applied.

The wrenches described are obviously invertible, so that they can be used either for screwing or unscrewing.

Having thus described the nature of my invention and the best means I know of carrying the same into practical effect, I claim—

A wrench for turning a pipe or other round object, having an opening to receive the object, a part of the internal periphery of which opening is adapted to embrace a part of the circumference of the object, the other part of the periphery being of spiral curvature offering an increasing space which receives a hard roughened roller mounted on side arms, in such a manner, that the roller is free to play longitudinally and transversely, substantially as and for the purpose set forth.

In testimony whereof I have signed my name to this specification, in the presence of two subscribing witnesses, this 1st day of July, A. D. 1896.

MONTAGU D. MARTINDALE.

Witnesses:
OLIVER IMRAY,
JNO. P. M. MILLARD.